ns
3,264,306
1-ARALKOXYCARBOSTYRILS
Leo A. Paquette, Portage Township, Kalamazoo County, Mich., assignor to The Upjohn Company, Kalamazoo, Mich., a corporation of Delaware
No Drawing. Filed Sept. 16, 1963, Ser. No. 309,311
2 Claims. (Cl. 260—289)

This invention relates to novel compositions of matter and to methods for producing them. In particular, this invention relates to novel 1-aralkoxycarbostyrils of the formula:

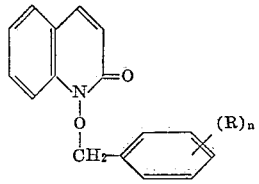

wherein R is selected from the group consisting of lower alkyl, lower alkoxy, and halogen, and wherein $n$ is an integer from zero to 3, inclusive. The R moieties can be located ortho, meta, or para to the methylene moiety. When $n$ is 2 or 3, the R moieties can be alike or different.

Preferred compounds of this invention are those wherein the maximum total number of carbon atoms in the moieties designated by $—(R)_n$ is eight. Particularly preferred are Formula I compounds wherein $n$ is 1.

Examples of lower alkyl are methyl, ethyl, propyl, butyl, pentyl, hexyl, heptyl, octyl, and isomeric forms thereof. Examples of lower alkoxy are methoxy, ethoxy, propoxy, butoxy, pentyloxy, hexyloxy, heptyloxy, octyloxy, and isomeric forms thereof. Examples of halogen are fluorine, chlorine, bromine, and iodine.

The novel 1-aralkoxycarbostyrils of Formula I are useful for the treatment of topical fungal infections in mammals, e.g., humans, cattle, horses, dogs, and cats, and in other animals, caused by such fungi as *Candida albicans*, *Microsporum canis*, and *Trichophyton rubrum*, or for eradicating such fungi from inanimate objects. Also they are useful in the treatment of plant infections caused by such fungi as *Fusarium oxysporum* var. *cubense*.

The compounds of Formula I exhibit central nervous system stimulatory activity and are therefore useful in animals, e.g., in mammals including humans, cattle, horses, dogs, and cats, and in birds including poultry as antidepressants and to improve alertness. These compounds also inhibit the action of Newcastle disease virus on chick embryo cells.

The novel compounds of Formula I are basic and exist either in the non-protonated (free base) form or in the protonated (acid addition salt) form depending on the pH of the environment. They form stable protonates, i.e., acid addition salts, on neutralization with suitable strong acids, for example, hydrochloric, hydrobromic, sulfuric, phosphoric, nitric, methanesulfonic, picric, trichloroacetic acids and the like. These acid addition salts are useful for upgrading the free bases.

The novel Formula I compounds form salts with fluosilicic acid which are useful as mothproofing agents according to U.S. Patent Nos. 1,915,334 and 2,075,359. They also form salts with thiocyanic acid which condense with formaldehyde to form resinous materials useful as pickling inhibitors according to U.S. Patent Nos. 2,425,320 and 2,606,155.

The novel 1-aralkoxycarbostyrils of Formula I are prepared by reacting a quinoline 1-oxide of the formula:

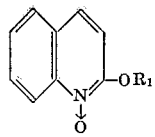

wherein $R_1$ is alkyl of 1 to 3 carbon atoms, inclusive, with an aralkyl halide of the formula:

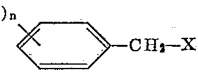

wherein R and $n$ are as defined above, and wherein X is selected from the group consisting of chloride, bromide, and iodide.

Quinoline 1-oxides of Formula II are either known in the art or can be prepared by methods known in the art [e.g., J. Chem. Soc. 1864–6 (1948); J. Chem. Soc. 2091–4 (1949)].

Aralkyl halides of Formula III are either known in the art or can be prepared by methods known in the art, for example, by halomethylation of an alkoxybenzene or alkylbenzene, by side chain halogenation of a halotoluene, or by replacement of the hydroxyl of the corresponding benzyl alcohol with halogen [e.g., Rodd, "Chemistry of Carbon Compounds," Elsevier, New York, vol. IIIA, pp. 124–7 (1954)].

The reaction between a Formula II quinoline 1-oxide and a Formula III aralkyl halide is carried out by mixing these two reactants and heating the mixture in the range about 75° to about 175° C., preferably in the range about 100° to about 150° C., for about 1 to about 10 hours. It is preferred to react about equal molecular amounts of the two reactants, although an excess of either reactant can be used. Although it is preferred to carry out the reaction in the absence of a diluent, especially when the reaction mixture is a homogenous liquid at the reaction temperature, an inert liquid diluent, for example, a hydrocarbon or an ether of the appropriate boiling point, can be used. Examples of suitable diluents are xylene, tetrahydronaphthalene, and dibutyl ether. The desired 1-aralkoxycarbostyril can be isolated from the reaction mixture and purified by conventional techniques, for example, by fractional distillation, recrystallization, or chromatography.

The invention can be more fully understood by the following examples.

EXAMPLE 1

*1-benzyloxycarbostyril*

A mixture of 2-ethoxyquinoline 1-oxide monohydrate (5.0 g.; 0.024 mole) and benzyl chloride (3.6 g.; 0.028 mole) was heated 2 hours at 110–130° C. The resulting semi-solid mixture was cooled and dissolved in 15 ml. of methylene chloride. This solution was adsorbed on a 250-g. column of Florisil (60–100 mesh; a magnesium trisilicate; obtained from the Floridin Company, Tallahassee, Florida). A trace of benzyl chloride was eluted with about 150 ml. of hexane. Subsequent elution with 2000 ml. of diethyl ether followed by evaporation of the latter eluate gave 3.3 g. of a white solid; M.P. 94–98° C. Recrystallization from diethyl ether gave 1-benzyloxycarbostyril in the form of white needles; M.P. 104–104.5° C.

*Analysis.*—Calcd. for $C_{16}H_{13}NO_2$: C, 76.47; H, 5.22; N, 5.57. Found: C, 76.15; H, 5.30; N, 5.79.

U.V.: (C₂H₅OH) 230 mμ (ε=37,800); sh. 245 mμ (ε=8,150); 271 mμ (ε=6,750); 278 mμ (ε=6,150); sh. 316 mμ (ε=4,500); 328 mμ (ε=5,550); sh. 342 mμ (ε=3,800).

I.R.: (principal band; mineral oil mull): 1662 cm.⁻¹.

EXAMPLE 2

1-p-chlorobenzyloxycarbostyril

Following the procedure of Example 1, 2-ethoxyquinoline 1-oxide monohydrate (5.0 g.; 0.024 mole) was reacted with p-chlorobenzyl chloride (4.5 g.; 0.028 mole) to give 1-p-chlorobenzyloxycarbostyril.

EXAMPLE 3

1-p-methoxybenzyloxycarbostyril

Following the procedure of Example 1, 2-ethoxyquinoline 1-oxide monohydrate (5.0 g.; 0.024 mole) was reacted with p-methoxybenzyl chloride (4.4 g.; 0.028 mole) to give 1-p-methoxybenzyloxycarbostyril.

EXAMPLE 4

1-p-meethylbenzyloxycarbostyril

Following the procedure of Example 1, 2-ethoxyquinoline 1-oxide monohydrate (5.0 g.; 0.024 mole) was reacted with p-methylbenzyl chloride (3.6 g.; 0.028 mole) to give 1-p-methylbenzyloxycarbostyril.

Following the procedure of Example 1 but using in place of benzyl chloride,
benzyl bromide;
o-methylbenzyl bromide;
m-iodobenzyl iodide;
3,4-dimethoxybenzyl chloride;
p-hexylbenzyl iodide;
4-methyl-3-chlorobenzyl bromide;
3,4,5-trimethylbenzyl chloride;
3,4,5-trimethoxybenzyl bromide;
p-butoxybenzyl bromide;
3,5-dibromobenzyl bromide; and
p-fluorobenzyl chloride, there are obtained
1-benzyloxycarbostyril;
1-o-methylbenzyloxycarbostyril;
1-m-iodobenzyloxycarbostyril;
1-(3,4-dimethoxybenzyloxy)carbostyril;
1-p-hexylbenzyloxycarbostyril;
1-(4-methyl-3-chlorobenzyloxy)carbostyril;
1-(3,4,5-trimethylbenzyloxy)carbostyril;
1-(3,4,5-trimethoxybenzyloxy)carbostyril;
1-p-butoxybenzyloxycarbostyril;
1-(3,5-dibromobenzyloxy)carbostyril; and
1-p-fluorobenzyloxycarbostyril, respectively.

Following the procedure of Example 1 but using in place of 2-ethoxyquinoline 1-oxide, 2-methoxyquinoline 1-oxide and 2-propoxyquinoline 1-oxide, the same product, 1-benzyloxycarbostyril, is obtained in each instance.

I claim:
1. A compound of the formula:

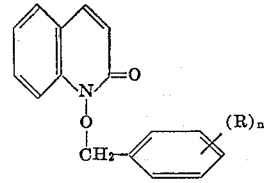

wherein R is selected from the group consisting of lower alkyl, lower alkoxy, and halogen, and wherein n is an integer from zero to 3, inclusive.

2. 1-benzyloxycarbostyril.

References Cited by the Examiner

Newbold et al.: J. Chem. Soc. (London), pp. 1864–6 (1948).

ALEX MAZEL, *Primary Examiner.*

HENRY R. JILES, NICHOLAS S. RIZZO,
*Examiners.*

D. M. KERR, D. G. DAUS, *Assistant Examiners.*